(12) United States Patent
Poornachandran et al.

(10) Patent No.: US 11,880,287 B2
(45) Date of Patent: *Jan. 23, 2024

(54) MANAGEMENT OF MICROSERVICES FAILOVER

(71) Applicant: Intel Corporation, Santa Clara, CA (US)

(72) Inventors: Rajesh Poornachandran, Portland, OR (US); Marcos Carranza, Portland, OR (US); Kshitij Arun Doshi, Tempe, AZ (US); Francesc Guim Bernat, Barcelona (ES); Karthik Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,950

(22) Filed: Dec. 7, 2022

(65) Prior Publication Data

US 2023/0205652 A1 Jun. 29, 2023

Related U.S. Application Data

(63) Continuation of application No. 17/560,857, filed on Dec. 23, 2021, now Pat. No. 11,561,868.

(51) Int. Cl.
*G06F 11/00* (2006.01)
*G06F 11/20* (2006.01)

(52) U.S. Cl.
CPC ...... *G06F 11/2025* (2013.01); *G06F 11/2028* (2013.01); *G06F 2201/85* (2013.01)

(58) Field of Classification Search
CPC ............. G06F 11/202; G06F 11/2025; G06F 11/2028; G06F 11/2035; G06F 2201/85
See application file for complete search history.

(56) References Cited

U.S. PATENT DOCUMENTS 11,561,868 B1 * 1/2023 Poornachandran ... G06F 11/202
2019/0102717 A1 4/2019 Wu
(Continued)

FOREIGN PATENT DOCUMENTS

EP 4202688 A1 6/2023

OTHER PUBLICATIONS

Notice of Allowance for U.S. Appl. No. 17/560,857, dated Oct. 13, 2022, 8 pages.
(Continued)

*Primary Examiner* — Michael Maskulinski
(74) *Attorney, Agent, or Firm* — Jaffery Watson Mendonsa & Hamilton LLP

(57) ABSTRACT

Embodiments described herein are generally directed to intelligent management of microservices failover. In an example, responsive to an uncorrectable hardware error associated with a processing resource of a platform on which a task of a service is being performed by a primary microservice, a failover trigger is received by a failover service. A secondary microservice is identified by the failover service that is operating in lockstep mode with the primary microservice. The secondary microservice is caused by the failover service to takeover performance of the task in non-lockstep mode based on failover metadata persisted by the primary microservice. The primary microservice is caused by the failover service to be taken offline.

21 Claims, 8 Drawing Sheets

(56) References Cited

U.S. PATENT DOCUMENTS

| | | |
|---|---|---|
| 2020/0228433 A1 | 7/2020 | Lee et al. |
| 2021/0117249 A1 | 4/2021 | Doshi et al. |
| 2021/0392477 A1 | 12/2021 | Taft et al. |
| 2022/0012129 A1 | 1/2022 | Doshi |
| 2022/0091922 A1* | 3/2022 | McLaughlin ....... G06F 11/0751 |

OTHER PUBLICATIONS

Vayghan et al., "Microservice Based Architecture: Towards High-Availability for Stateful Applications with Kubernetes", 2019 IEEE 19th International Conference on Software Quality, Reliability and Security (QRS), pp. 176-185.

Extended European Search Report for EP 22200046.5, dated May 26, 2023, 7 pages.

Notice of Publication for CN Application No. 202211452847.4, dated Jun. 30, 2023, 3 pages.

\* cited by examiner

MANAGEMENT OF MICROSERVICES FAILOVER

CROSS REFERENCE TO RELATED APPLICATIONS

The present patent application is a continuation application claiming priority from U.S. application Ser. No. 17/560,857, filed Dec. 23, 2021, the entire contents of which are hereby incorporated herein by reference for all purposes.

TECHNICAL FIELD

Embodiments described herein generally relate to the field of microservices architecture and, more particularly, to intelligently handling failover issues in a microservices architecture.

BACKGROUND

Datacenters often leverage a microservice architecture to support various service offerings. A microservice architecture can arrange an application as a collection of loosely-coupled microservices. Microservices can refer to processes that communicate over a network to fulfill a goal using technology-agnostic protocols. In some cases, the microservices may be deployed using a container orchestration platform providing containerized workloads and/or services. The container orchestration platforms may utilize a service mesh to manage the high volume of network-based inter-process communication among the microservices. The service mesh is a dedicated software infrastructure layer for the microservices that includes elements to enable the communication among the microservices to be fast, reliable, and secure. The service mesh provides capabilities including service discovery, load balancing, encryption, observability, traceability, and authentication and authorization. The microservices deployment model provided by the service mesh is becoming increasingly elastic, providing flexibility to scale up and scale down microservices.

In a service mesh environment, a typical worker node in a compute cluster can handle hundreds of container workloads at the same time. These worker nodes may also have statically-attached specialized hardware accelerators optimized for compute intensive tasks. For instance, a class of hardware accelerators can be optimized to efficiently run cryptography and compression algorithms, or to run machine-learning acceleration algorithms. Such hardware accelerators may be provided as a form of disaggregated computing, where the workloads are distributed on disaggregated compute resources, such as CPUs, GPUs, and hardware accelerators (including field programmable gate arrays (FPGAs)), that are connected via a network instead of being on the same platform and connected via physical links such as peripheral component interconnect express (PCIe). Disaggregated computing enables improved resource utilization and lowers ownership costs by enabling more efficient use of available resources. Disaggregated computing also enables pooling a large number of hardware accelerators for large computation making the computation more efficient and better performing.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
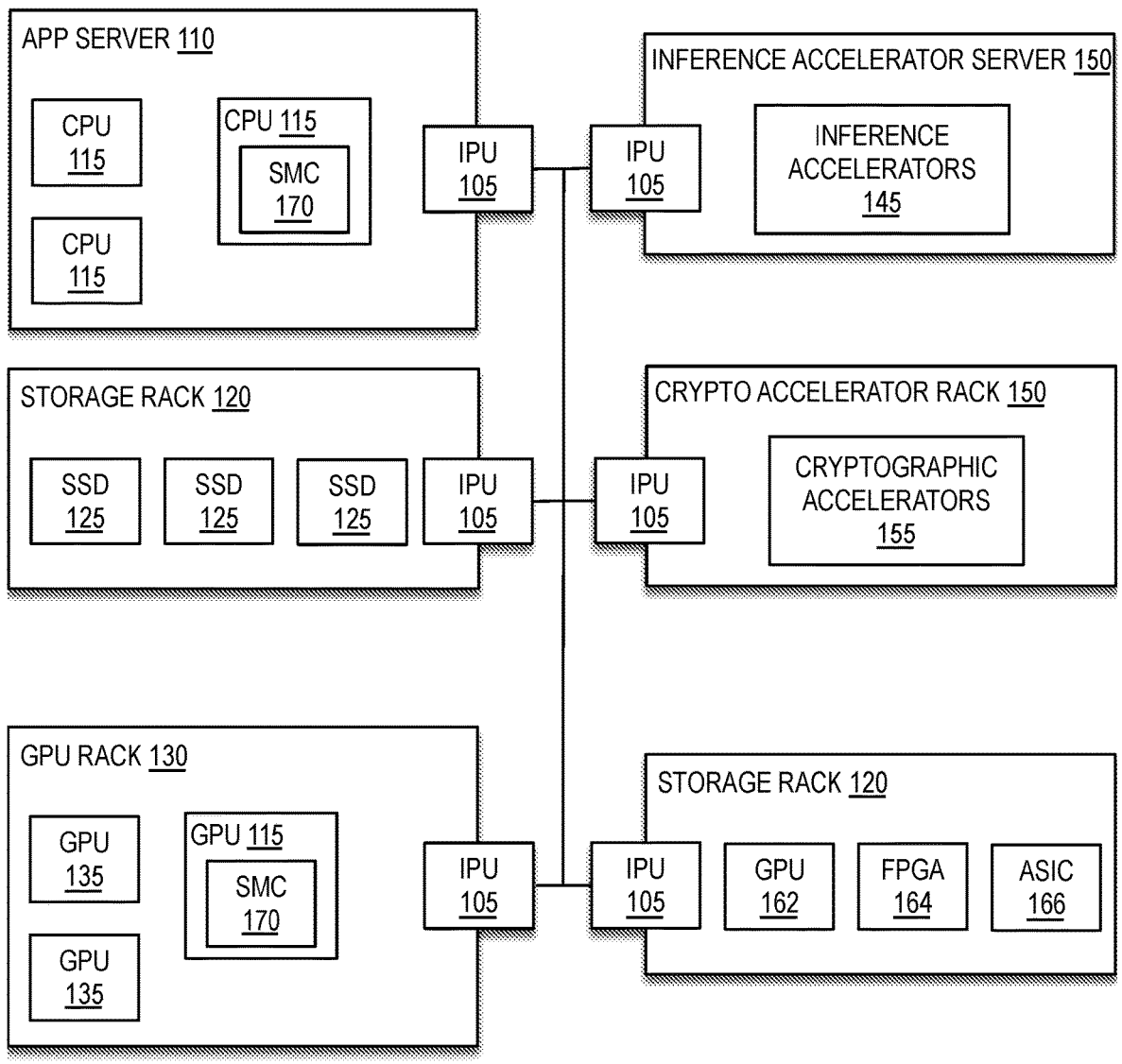
FIG. 1 is a block diagram illustrating a datacenter system that provides for dynamic end-to-end microservices failover and resiliency across compute, storage, and communications according to some embodiments.

Embodiments described herein are generally directed to intelligent management of microservices failover. Cloud service providers (CSPs) are deploying solutions in datacenters where processing of a workload is distributed on various compute resources, such as central processing units (CPUs), graphics processing units (GPUs), and/or hardware accelerators (including, but not limited to, GPUs, field programmable gate arrays (FPGAs), application-specific integrated circuits (ASICs), cryptographic accelerators, compression accelerators, and so on). Traditionally, these compute resources were running on the same platform and connected via physical communication links, such as peripheral component interconnect express (PCIe). Meanwhile, layering monolithic applications on top of these traditional platforms results in inefficiencies in handling failure issues. For example, in the context of a monolithic application, a reactive approach for handling a failure scenario may involve restarting the service or transferring the service to a redundant system within a datacenter. Based on the use of telemetry, predictive maintenance data, and errors being observed in the system, proactive mitigation may be performed, but the granularity of the mitigation remains at the platform or service level.

Disaggregated computing is on the rise in data centers. With disaggregated computing, CSPs are deploying solutions where processing of a workload is distributed on disaggregated compute resources, such as CPUs, GPUs, and hardware accelerators (including FPGAs, ASICs, etc.), that are connected via a network instead of being on the same platform and connected via physical links such as PCIe. Disaggregated computing enables improved resource utilization and lowers ownership costs by enabling more efficient use of available resources. Disaggregated computing also enables pooling a large number of hardware accelerators for large computation making the computation more efficient and better performing.

Hardware accelerators (also referred to herein as a hardware accelerator resources, hardware accelerator devices, accelerator resource, accelerator device, and/or extended resource) as discussed herein may refer to any of special-purpose central processing units (CPUs), graphics processing units (GPUs), general purpose GPUs (GPGPUs), field programmable gate arrays (FPGAs), application-specific integrated circuits (ASICs), inference accelerators, cryptographic accelerators, compression accelerators, other special-purpose hardware accelerators, and so on.

Moreover, the datacenters used by CSPs to deploy a service mesh often leverage a microservice architecture to provide for network infrastructure services of the service mesh. A microservice architecture can arrange an application as a collection of loosely-coupled microservices. The microservices may be the processes that communicate over a network to fulfill a goal using technology-agnostic protocols. In some cases, the microservices can be deployed using a container orchestration platform providing containerized workloads and/or services. In some examples, the service may be a large service comprising hundreds of microservices working in conjunction with each other or may be a modest individual service. A workload may refer to a resource running on the cloud consuming resources, such as computing power. In some embodiments, an application, service, or microservice may be referred to as a workload, which denotes the workload can be moved around between different cloud platforms or from on-premise to the cloud or vice-versa without any dependencies or hassle.

The container orchestration platforms may utilize a service mesh to manage the high volume of network-based inter-process communication among the microservices. The service mesh is a dedicated software infrastructure layer for the microservices that includes elements to enable the communication among the microservices to be fast, reliable, and secure. The service mesh provides capabilities including service discovery, load balancing, encryption, observability, traceability, and authentication and authorization.

As previously noted, the microservices deployment model provided by the service mesh is becoming increasingly elastic, providing flexibility to scale up and scale down microservices. As the elasticity of deployment of microservices increases and as microservices architecture transitions to utilizing disaggregated computing resources, there can be microservices deployed for a service across many heterogeneous hardware devices (e.g., intellectual property core or block (IPs), heterogeneous processing units (XPUs)). Disaggregated computing combined with microservices architecture enables improved resource utilization and lowers ownership costs by enabling more efficient use of available resources, for example, by allowing a hardware/software instance to be created for a service (e.g., a video streaming service) based on various alternative sets of competing ingredients (e.g., one that may use an all CPU environment and another that nay make use of GPUs). Given the finer granularity of both hardware and software components, it would be desirable to handle failover issues more intelligently and at the lowest possible layer of the microservices service stack layers (e.g., a device layer, a microservice layer, a virtual machine monitor (VMM) layer, a VM layer, a guest operating system (OS) layer, etc.) at which such issues can be addressed.

As such, various embodiments described herein propose an approach to handling errors involving dynamic end-to-end microservices failover and resiliency across compute, storage, and communications. According to one embodiment, responsive to an uncorrectable hardware error associated with a processing resource of a platform on which a task of a service is being performed by a primary microservice, a failover trigger is received by a failover service implemented by a controller of the service. A secondary microservice is identified by the failover service that is operating in lockstep mode with the primary microservice. The secondary microservice is caused by the failover service to takeover performance of the task in non-lockstep mode based on failover metadata persisted by the primary microservice. The primary microservice is caused by the failover service to be taken offline.

Furthermore, in some implementations, based on the particular hardware/software configuration for the service instance at issue and service level agreements (SLAs) for the service including quality of service (QoS) metrics for the service (and its microservices) and service level objectives (SLOs) for the service (and its microservices), various layers of the microservices service stack layers may be provisioned with policies and/or thresholds to facilitate taking of policy-based actions when processing various errors that may arise during performance of tasks associated with the service by the microservices.

While various examples are described with reference to a datacenter utilizing disaggregated computing, the methodologies described herein are equally applicable to different datacenter environments, including those in utilizing platforms with integrated hardware accelerators and/or discrete hardware accelerators connected to respective platforms via physical links.

While various examples may be described herein with reference redundant implementations of the same microservice implementation involving a pair of failover microservice agents (e.g., a primary microservice operating in lockstep mode with a secondary micro service), it is to be understood that the failover approaches described herein are equally applicable to redundant implementations including more than two failover microservice agents.

While various examples may be described herein with reference to responding to and handling hardware errors, it is to be appreciated an error triggering a failover from a primary microservice to a secondary microservice may alternatively represent a software error.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein a "failover agent" generally refers to an agent that provides some level of redundancy to a hardware/software instance of a service. In the context of microservices service stack layers (e.g., a device layer, a microservice layer, a VMM layer, a VM layer, a guest OS layer, etc.), zero or more failover agents may be provided within each layer depending upon the SLA of the service instance at issue. In various embodiments described herein, microservice deployments may support reliability and availability of a service instance by including failover microservice agents and/or making use of infrastructure with redundancy features.

As used herein a "failover microservice agent" generally refers to a failover agent in the form of a microservice. In various embodiments described herein, it is assumed an application developer has included support for redundant deployment of the same microservice implementation for the same task or set of operations. For example, multiple implementations of microservice deployments with high usage requirements or providing critical functionality of a service can be created to better guarantee high performance, availability and increased reliability, even when unexpected exceptions or outages occur. In some examples, the redundant deployment of the same microservice deployment may include a pair of failover microservice agents (e.g., a primary microservice operating in lockstep mode with a secondary microservice). The secondary microservice may monitor the health or operational status of the primary microservice via respective sidecars associated with the primary and secondary microservices or may be informed of a failure or anticipated failure of the primary microservice by an interrupt, a software exception, or by a failover service of a controller of the service. Responsive to a failure or anticipated failure of the primary microservice, the secondary microservice may takeover for the primary microservice by loading failover metadata (e.g., including the state and/or checkpoints) persisted by the primary microservice.

In computing, "lockstep" is a technical term of art that refers to running the same set of operations at the same time in parallel, but it is to be appreciated other accepted terms may also be used in the industry. In various examples described herein, multiple failover microservice agents (e.g., a primary microservice and a secondary microservice) may be said to be running in lockstep or in lockstep mode to provide redundancy for a particular task or set of operations of a service. As described further below, this lockstep operation of failover microservices agents may also involve the primary microservice persisting failover metadata to facilitate failover to and/or takeover by a secondary microservice.

In various examples described herein, there are two general types of hardware errors, "correctable" and "uncorrectable," both of which may be detected by the affected processing resource. An uncorrectable hardware error, in contrast to a correctable hardware error, for which the processing resource can take corrective action and resume operation, refers to a type of hardware error from which the processing resource cannot recover. As such, an uncorrectable error may also be referred to as an "unrecoverable" error herein. Uncorrectable errors may arise as a result of overclocking or overheating but may also be caused by bus errors introduced by other failing components, like memory or I/O devices. Non-limiting examples of uncorrectable errors include system bus errors (e.g., an error communicating between a processor and the motherboard), uncorrectable memory errors (e.g., those for which error correction codes are unable to correct), and cache errors.

When a microservice is said to be "taken offline" or "offlined" herein, depending upon the implementation, it means the particular instance of the microservice (e.g., the primary microservice) is deactivated, suspended, or deleted. It is to be noted that the same instance may subsequently be restarted or reset after having been deactivated or suspended to restore redundancy, for example, to allow the formerly deactivated or suspended microservice instance to serve as a backup to another instance of the microservice (e.g., the former secondary microservice) that took over for the microservice at issue. Alternatively, when a microservice has been deleted, a new instance of the microservice may be launched to restore redundancy.

As used herein, an "XPU" generally refers to a processing resource or a hardware accelerator. The XPU may be an offload target commanded by a CPU or may be a CPU. In a heterogeneous computing environment including disaggregated compute resources, microservices may be concurrently executing on different types of hardware accelerators. Non-limiting examples of XPUs include CPUs, Graphics Processing Units (GPUs), Field-Programmable Gate Arrays (FPGAs), Application-Specific Integrated Circuits (ASICs), Digital Signal Processors (DSPs), Tensor Processing Units (TPUs), Video Processing Units (VPUs), Infrastructure Processing Units (IPUs), Application Processing Units (APUs), Data Processing Units (DPUs), Network Processing Units (NPUs), and Smart Network Interface Cards (SmartNICs).

FIG. 1 is a block diagram illustrating a datacenter 100 that provides for dynamic end-to-end microservices failover and resiliency across compute, storage, and communications according to some embodiments. Datacenter 100 illustrates an example datacenter, for example, hosted by a cloud service provider (CSP)) providing a variety of XPUs (heterogeneous processing units) for processing tasks of a service hosted by the datacenter, where an XPU can include one or more of: a central processing unit (CPU) 115, a graphics processing unit (GPU) 135 (including a general purpose GPU (GPGPU), ASICs, or other processing units (e.g., accelerators 145, 155, 166, inference accelerators 145, cryptographic accelerators 155, programmable or fixed function FPGAs 164, application-specific integrated circuit (ASICs) 166, compression accelerators, and so on). The datacenter 100 may also provide storage units for data storage tasks, as well. The storage units may include solid-state drives (SSDs) (e.g., SSD 125), for example. The XPUs and/or storage units may be hosted with similar-type units (e.g., CPUS 115 hosted on an application server (app server) 110, SSDs 125 hosted on a storage rack 120, GPUs 135 hosted on a GPU rack 130, inference accelerators 145 hosted on an inference accelerator server 140, cryptographic accelerators 155 hosted on a cryptographic accelerator rack 150, and general-purpose accelerators 162, 164, 166 hosted on accelerator rack 160.

In the context of the present example, the datacenter 100 provides its hosted processing components 115, 125, 135, 145, 155, 162, 164, 166 with a variety of offloads using, for example, IPUs 105 that may be directly attached to respective host processing component. Although IPUs 105 are discussed for purposes of example, it is to be noted that other programmable network devices, such as DPUs and/or Smart Network Interface Cards (SmartNICs), may be used interchangeably for IPUs 105 herein. The offloads provided may be networking, storage, security, etc. This allows the processing components 115, 125, 135, 145, 155, 162, 164, 166 to run without a hypervisor, and provides CSPs the capability of renting out the entire host in a datacenter to their security-minded customers or avoid cross-talk and other problems associated with multi-tenant hosts.

An IPU 105 can provide a role in data centers by providing the datacenter operator, such as a Cloud Service Provider (CSP), a control point for security, acceleration, telemetry and service orchestration. IPU architecture may build upon existing SmartNIC features and may be a part of controlling security and data acceleration within and across distributed platforms. It is a secure domain controlled by CSPs for managing a platform, providing services to tenants, and securing access into the data center network. The IPU 105 increases the performance and predictability for distributed runtimes and enables scaling to multi-terabit throughputs by offloading host services, reliable transport, and optimizing data copies.

IPUs 105 have grown in complexity over the years, starting with foundational NICs, whose sole purpose was to get packets into the host and out of it. With the addition of networking software offload, NICs have now evolved to become SmartNICs, that are capable of offloading functions, such as VSwitch, VIRTIO-Net, AVF, etc. Remote disaggregated storage architectures provide a further evolution, where compute and storage need not be co-located anymore. Instead, large compute clusters may be connected to large storage clusters over the network. Increase in network speeds, and evolution of protocols made this a possibility. One of the advantages that remote disaggregated storage offers over direct attached storage is that compute and memory can be developed and updated at different cadences. The amount of storage that is attached to a compute node is not limited by physical addition or removal of hard-drives anymore but can be hot-plugged as a physical function (PF) to a PCIe Switch. Technologies such as Smart End Point enable IPUs to have firmware-controlled switches, along the PCIe Switch itself to not be limited by hardware implementations.

As discussed above, embodiments herein provide for intelligent handling of failover issues in a microservices architecture. In one implementation, datacenter system 100 includes one or more resources that can implement service management components (SMCs) 170 at various levels of a hierarchy. For example, an SMC 170 may be implemented at a platform level to facilitate control of microservices within the same platform and another SMC (not shown) higher up in the hierarchy and which may be referred to herein as a "fleet management module" may be implemented at a rack or datacenter level to allow control of microservices that may span platforms. Additional details regarding an example of SMC 170 are described further below with reference to FIG. 3.

For purposes of illustration, in the context of the present example, service management component 170 is shown in the CPU 115 and GPU 135, respectively, of datacenter 100. However, it is to be appreciated the service management component 170 may operate additionally or alternatively in one or more of the various other disaggregated resources of datacenter 100 in accordance with implementations herein. As such, the resources of datacenter 100 may be in different platforms connected via a network (not shown) in the datacenter 100. In some implementations, software and/or middleware can cause the resources of datacenter 100 to logically appear to be in the same platform. Furthermore, transport protocols implemented in software and/or hardware (e.g., network interface cards (NICs)) can make the remote resources logically appear as if they are local resources as well.

Further details of the service management component 170 facilitating the control and management of microservices (e.g., microservice failover agents) is described below.

Figure 2:
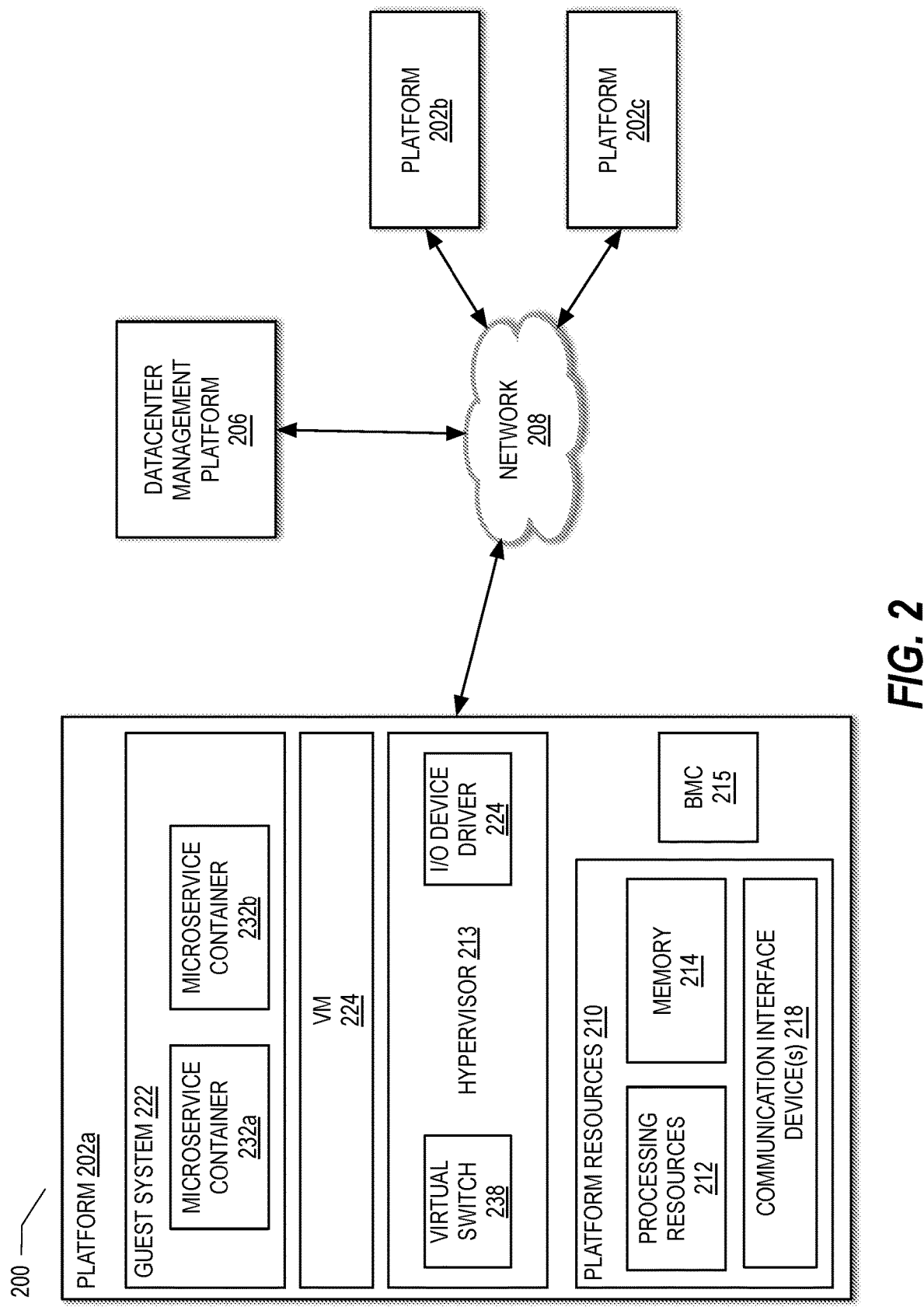
FIG. 2 is a block diagram illustrating components of a computing platform in a datacenter according to some embodiments.

FIG. 2 is a block diagram illustrating components of a computing platform 202a in a datacenter 200 according to some embodiments. In the embodiment depicted, platforms 202a, 202b, and 202c (collectively referred to herein as platforms 202), along with a datacenter management platform 206 are interconnected via network 208. In other embodiments, a computer system may include any suitable number of (i.e., one or more) platforms. In some embodiments (e.g., when a computer system includes a single platform), all or a portion of the datacenter management platform 206 may be included on a platform 202.

A platform 202 may include platform resources 210 with one or more processing resources 212 (e.g., XPUs including CPUs, GPUs, FPGAs, ASICs, other hardware accelerators), memories 214 (which may include any number of different modules), a baseboard management controller (BMC) 215, communication interface device(s) 218, and any other suitable hardware and/or software to execute a hypervisor 213 or other operating system capable of executing workloads associated with applications running on platform 202. In some embodiments, platform 202 may function as a host platform for one or more guest systems 222 that invoke these applications and which may be hosted by one or more VMs 224. While not shown, it is to be noted guest system 222 may be running an SMC (e.g., SMC 170 of FIG. 1).

Platform 202a may represent any suitable computing environment, such as a high-performance computing environment, a datacenter, a communications service provider infrastructure (e.g., one or more portions of an Evolved Packet Core), an in-memory computing environment, a computing system of a vehicle (e.g., an automobile or airplane), an Internet of Things (IoT) environment, an industrial control system, other computing environment, or combination thereof.

Each platform 202 may include platform resources 210. Platform resources 210 can include, among other logic enabling the functionality of platform 202, one or more processing resources 212 (such as CPUs, GPUs, FPGAs, other hardware accelerators, etc.), memory 214, and communication interface devices 228. Although three platforms are illustrated, computer platform 202a may be interconnected with any suitable number of platforms. In various embodiments, a platform 202 may reside on a circuit board that is installed in a chassis, rack, or other suitable structure that comprises multiple platforms coupled together through network 208 (which may comprise, e.g., a rack or backplane switch).

In the case of processing resources 212 comprising CPUs, the CPUs may each comprise any suitable number of processor cores and supporting logic (e.g., uncores). The cores may be coupled to each other, to memory 214 and/or to a communication interface device 218, through one or more controllers residing on the processing resource 212 (e.g., CPU). In some embodiments, a processing resource 212 is embodied within a socket that is permanently or removably coupled to platform 202a. A platform 202 may include any suitable number of processing resources 212.

Memory 214 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 214 may be used for short, medium, and/or long term storage by platform 202a. Memory 214 may store any suitable data or information utilized by platform resources 210, including software embedded in a computer readable medium, and/or encoded logic incorporated in hardware or otherwise stored (e.g., firmware). Memory 214 may store data that is used by cores of processing resources 212. In some embodiments, memory 214 may also comprise storage for instructions that may be executed by the processing resources 212 (e.g., cores of CPUs) or other processing elements (e.g., logic resident on chipsets (not shown)).

In one embodiment, BMC 215 represents a specialized service processor that monitors the physical state of a platform 202 or other hardware devices using sensors and communicating with a system administrator, for example, via an independent connection. A BMC is part of the Intelligent Platform Management Interface (IPMI) and is usually contained in the motherboard or main circuit board of the device to be monitored. Traditionally, the sensors of a BMC measure internal physical variables such as temperature, humidity, power-supply voltage, fan speeds, communications parameters and OS functions and notify an administrator if any of these variables happen to stray outside of specified limits. The administrator may then then take corrective action by remote control. For example, the monitored device can be power cycled or rebooted as necessary. In this way, a single administrator can remotely manage numerous servers and other devices simultaneously, saving on the overall operating cost of the network and helping to ensure its reliability. As described further below, in various examples, the BMC 215 may be involved in processing of machine check exceptions (MCEs) that may be used in various embodiments, for among other things, to break the lockstep operation of a pair of microservice failover agents. The BMC 215 may have the capability to queue up received MCEs and/or or error data from machine check banks for processing based on a configured policy-based order (e.g., first in, first out (FIFO)). This provides the capability to scale out and scale-up in terms of handling an array of microservices across one or more sockets. As described further below with reference to FIG. 6, the BMC 215 may be configured with policies and/or lockstep thresholds to facilitate its participation and assistance in various microservice error recovery scenarios.

Communication interface device(s) 228 may include one or more physical network interface controllers (NICs), also known as network interface cards or network adapters. A NIC may include electronic circuitry to communicate using any suitable physical layer and data link layer standard such as Ethernet (e.g., as defined by an IEEE 802.3 standard), FibreChannel, InfiniBand, Wi-Fi, or other suitable standard. A NIC may include one or more physical ports that may couple to a cable (e.g., an Ethernet cable). Communication interface devices 218, communication interfaces 228 may be used for the communication of signaling and/or data between platform resources 210 and one or more networks 208 and one or more devices coupled to the network 208. For example, communication interface 228 may be used to send and receive network traffic such as data packets. In a particular embodiment, communication interfaces 228 comprise one or more physical NICs. These NICs may enable communication between any suitable element of platform resources 210 (e.g., processing resources 212 or memory 214) and another device coupled to network 208 (e.g., elements of other platforms or remote computing devices coupled to network 208 through one or more networks).

Platform resources 210 may receive and perform any suitable types of workloads. A workload may include any request to utilize one or more resources of platform resources 210, such as one or more cores or associated logic. For example, a workload may comprise a request to instantiate a software component, such as an I/O device driver 224 or guest system 222; a request to process a network packet received from a microservices container 232a, 232b (collectively referred to herein as microservice containers 232) or device external to platform 202a (such as a network node coupled to network 208); a request to execute a process or thread associated with a guest system 222, an application running on platform 202a, a hypervisor 213 or other operating system running on platform 202a; or other suitable processing request.

A microservice container 232 may emulate a computer system with its own dedicated hardware. A container 232 may refer to a standard unit of software that packages up code and all its dependencies, so the application runs quickly and reliably from one computing environment to another. A container image is a lightweight, standalone, executable package of software that includes components used to run an application: code, runtime, system tools, system libraries and settings. Containers 232 take advantage of a form of operating system (OS) virtualization in which features of the OS are leveraged to both isolate processes and control the amount of CPU, memory, and disk that those processes have access to.

When implementing containers 232, hypervisor 213 may also be referred to as a container runtime. Although implementations herein discuss virtualization of microservice functionality via containers, in some implementations, virtual machines may be hosted by hypervisor 213 and utilized to host microservices and/or other components of a service provided by an application.

A hypervisor 213 (also known as a virtual machine monitor (VMM)) may comprise logic to create and run guest systems 222. The hypervisor 213 may present guest operating systems run by virtual machines with a virtual operating platform (i.e., it appears to the virtual machines that they are running on separate physical nodes when they are actually consolidated onto a single hardware platform) and manage the execution of the guest operating systems by platform resources 210. Services of hypervisor 213 may be provided by virtualizing in software or through hardware-assisted resources that utilize minimal software intervention, or both. Multiple instances of a variety of guest operating systems may be managed by the hypervisor 213. Each platform 202 may have a separate instantiation of a hypervisor 213.

In implementations herein, the hypervisor 213 may also be implemented as a container runtime environment capable of building and containerizing applications.

Hypervisor 213 may be a native or bare-metal hypervisor that runs directly on platform resources 210 to control the platform logic and manage the guest operating systems. Alternatively, hypervisor 213 may be a hosted hypervisor that runs on a host operating system and abstracts the guest operating systems from the host operating system. Hypervisor 213 may include a virtual switch 238 that may provide virtual switching and/or routing functions to virtual machines of guest systems 222.

Virtual switch 238 may comprise a software element that is executed using components of platform resources 210. In various embodiments, hypervisor 213 may be in communication with any suitable entity (e.g., a SDN controller) which may cause hypervisor 213 to reconfigure the parameters of virtual switch 238 in response to changing conditions in platform 202 (e.g., the addition or deletion of microservice containers 232 or identification of optimizations that may be made to enhance performance of the platform).

The elements of platform resources 210 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus, to name a few examples.

Elements of the computer platform 202a may be coupled together in any suitable manner such as through one or more networks 208. A network 208 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

In implementations herein, one or more of processing resources 212 and/or microservice containers 232 may provide a service management component (not shown), such as service management component 170 described with respect to FIG. 1.

Figure 3:
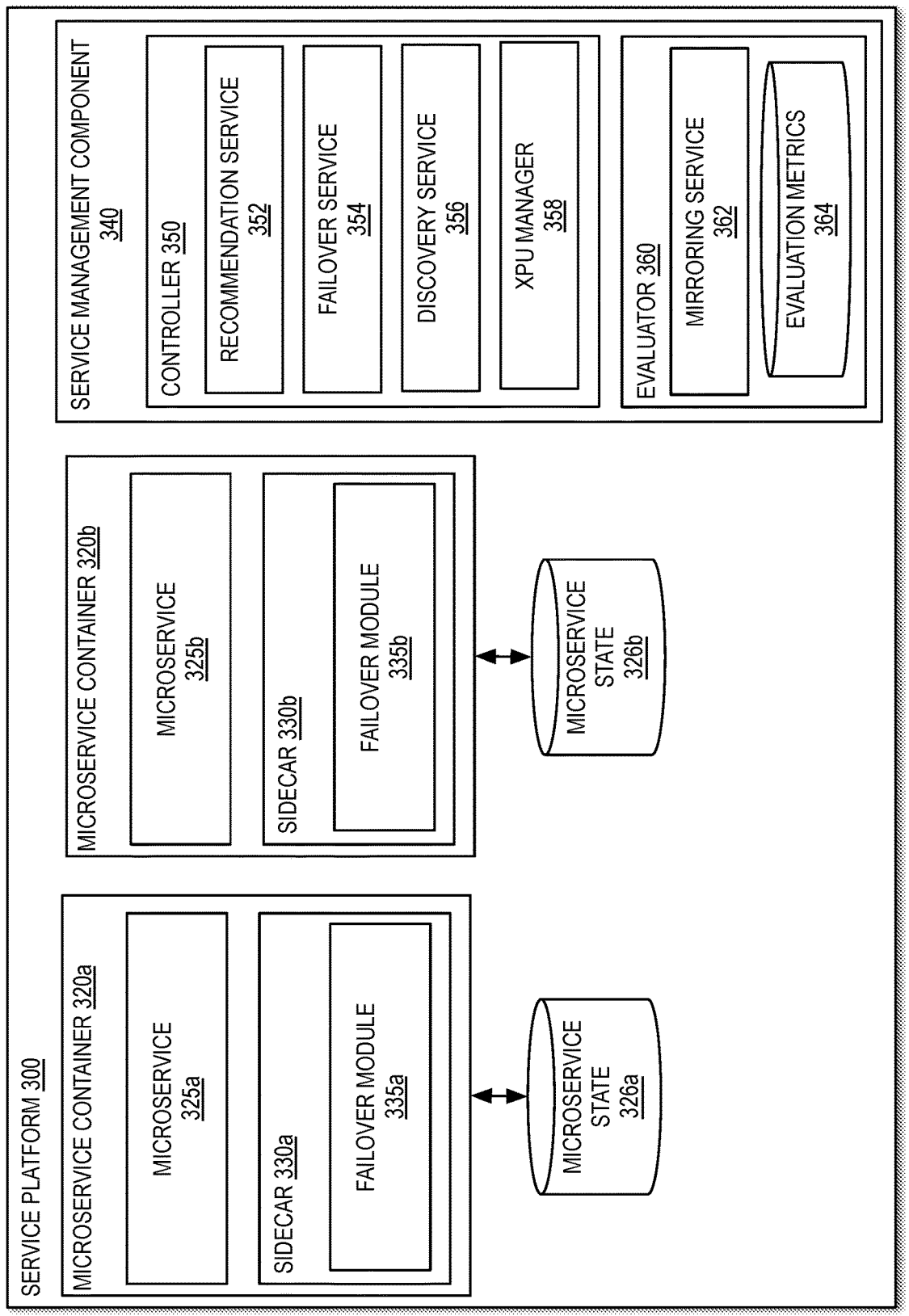
FIG. 3 is a block diagram of a service platform implementing management of failover microservice agents of a service to according to some embodiments.

FIG. 3 is a block diagram of a service platform 300 implementing management of failover microservice agents of a service to according to some embodiments. Service platform 300 may represent a non-limiting example of platform 202 of datacenter 200 or 100. In some implementations, service platform 300 may be hosted in a datacenter that may or may not utilize disaggregated computing. Embodiments herein are not limited to implementation in disaggregated computing environments and may be deployed across a large spectrum of different datacenter environments. The disaggregated computing datacenter 200 of FIG. 2 is provided as a non-limiting example implementation for service platform 300 and is not intended to limit embodiments herein.

In one implementation, service platform 300 may host a service implemented with one or more microservice containers 320a, 320b (collectively referred to herein as microservice container 320). Microservice containers 320 may be the same as microservice containers 232 described with respect to FIG. 2. The service may be orchestrated and managed using service management component (SMC) 340, which may be complementary to a container orchestration platform (not shown). SMC 340 may be implemented by hardware, software, firmware and/or any combination of hardware, software and/or firmware.

Service platform 300 may function as a host platform for a service, implementing deployed microservices of the service as one or more microservice containers 320 that invoke functionalities and perform various tasks of the service. Service platform 300 may represent any suitable computing environment, such as a high-performance computing environment, a datacenter, a communications service provider infrastructure (e.g., one or more portions of an Evolved Packet Core), an in-memory computing environment, a computing system of a vehicle (e.g., an automobile or airplane), an Internet of Things (IoT) environment, an industrial control system, other computing environment, or combination thereof. In implementations herein, containers 320 may be implemented using hardware circuitry, such as one or more of a CPU, a GPU, a hardware accelerator, and so on. In one embodiment, containers 320 may be implemented using platform 202 described with respect to FIG. 2.

Microservices containers 320 may include logic to implement the functionality of the microservice 325a, 325b (collectively referred to herein as microservices 325) and a sidecar 330a, 330b (collectively referred to herein as sidecars 330. In various embodiments herein, some subset of microservices of a service may be redundantly deployed, for example, to accommodate high usage requirements and/or provide redundancy for critical functionality. For example, microservice 325a may represent a primary or leader microservice and microservice 325b may represent a secondary or follower microservice and the primary and secondary may be operating in lockstep mode using the same sidecar interface. In this manner, the secondary microservice may takeover for the primary microservice if the primary microservice experiences a non-recoverable error as described further below with reference to FIG. 7.

A sidecar 330 can be a container that runs on the same pod as the microservice 325. As depicted herein, sidecar 330 is illustrated as part of the microservice container 320, but sidecar 330 may be implemented as a separate container than microservice 325 functionality in some implementations. In implementations herein, sidecar 330 may include one or more components (e.g., failover module 335a, 335b) to support policy provisioning, redundancy monitoring, persistence of failover metadata, error handling, and/or communication with the service management component 340. Each microservice may make use of a data store (e.g., microservice state 326a, 326b) to persist failover metadata (e.g., the state and/or checkpoints) to allow a microservice failover agent to assume its responsibilities.

Returning to SMC 340 it may represent a non-limiting example of SMC 170 of FIG. 1. In the present example, SMC 340 is shown including a controller 350 and an evaluator 360. In one embodiment, controller 350 may perform various tasks to facilitate microservice failover/takeover. For example, controller 350 may include a discovery service 356, a recommendation service 352, a failover service, and an XPU manager 358. Discovery service 356 may be responsible for discovery of the functionality, health, and availability of XPUs for use by a service instance, discovery of redundancy features (e.g., failover agents) supported by the infrastructure and the microservices architecture of the service at issue. For example, microservices may expose their capabilities (including support for failover agents) in a microservices registry database (not shown) accessible to the discovery service. Discovery service 356 may also be responsible for determining whether compatible software versions of microservices are available for the particular datacenter environment and available XPUs. In one embodiment, during a discovery phase, discovery service 356 may create an interdependency flow matrix of all microservices that are stitched together to provide the service and may create various dependency graphs representing various options for deploying the service and/or one or more contingency plans should failures occur at a layer of the microservices service stack layers. The information collected during the discovery phase may be useful in connection with understanding good matches between a particular microservice and a particular processing resource to facilitate placement decisions that may be made by recommendation service 352.

Responsive to a request to create a service instance, recommendation service 352 may be responsible for making a proposal for a hardware/software instance to implement a particular service taking into consideration an SLA for the service instance, interdependency based conditional resiliency, availability of failover agents at various layers of the microservices service stack, and/or historical metrics. For example, given the candidate XPU interdependency flow graph and the SLA model architecture, recommendation service 352 may seek to optimize the heterogeneous system solution to arrive at a proposed hardware/software instance for the service. The recommendation service 352 may also make placement strategy recommendations for the various microservices making up the service and/or including VM/Docker migration With respect to conditional resiliency, the recommendation service 352 may, for example, propose implementation of various resiliency patterns to achieve high resiliency for a service instance of a streaming service that is intended to support a live streaming event, whereas a service instance of the streaming service that is intended to simply stream stored content on a best-effort basis may include less resiliency. In some embodiments, there could be also factor of conditional resiliency based on external factors that can be controlled. For instance, at certain temperatures the likelihood of failure of errors on compute maybe higher. In on embodiment, temperatures may be controlled with placement and/or may be predicted depending on the type of service. The recommendation service 352 may factor in such placement issues in order to reduce the failure of nodes or network (or malfunction of certain devices) by making placement recommendations that take into consideration such external factors, the computing environment and/or network at issue network, as well as the SLA.

Failover service 354 may be responsible for facilitating recovery from various failovers within a particular layer of the microservices service stack layers and/or across the microservices service stack layers. In some embodiments, failover service 354 may be involved in managing the identified failover agents from the discovery phase for cross service and layer monitoring and failover. For example, when a primary microservice and a secondary microservice are running on different platforms, failover service 354 may propagate control and/or management directives targeting a remote microservice up a hierarchy of SMCs to a fleet management module to facilitate control of microservices that may span platforms.

XPU manager 358 may understand which hardware can support failover scenarios and may be responsible for onboarding, off-boarding, and revocation management for the microservices of a service.

In one embodiment, evaluator 360 may be responsible for, among other things, providing feedback to controller 350, tracking why various failover/takeover operations took place and may log error data for subsequent offline review. Evaluator 360 may also maintain evaluation metrics 364, for example, including on-boarding, off-boarding, revision management, etc. In the context of the present example, evaluator 360 is also shown including a mirroring service 362. Mirroring service may be responsible for preparing for container and sidecar mirroring, so as to be ready to spawn up a new container and sidecar on short notice, potentially with different run time options from before, for example, by factoring in prior observations.

In one embodiment, SMC 340, including controller 350 and evaluator 360 may operate as part of a trusted execution environment (TEE) (not shown) generated by an underlying computing system(s) hosting SMC 340. In some implementations, a subset of the service management components 340 may operate as part of the TEE. The TEE may be authenticated and protected from unauthorized access using hardware support of the underlying computing system(s). Illustratively, the TEE may be embodied as one or more secure enclaves established using Intel™ Software Guard Extensions (SGX) technology. The TEE may also include or otherwise interface with one or more drivers, libraries, or other components of the underlying computing system(s) to interface with one or more other XPUs.

Figure 4:
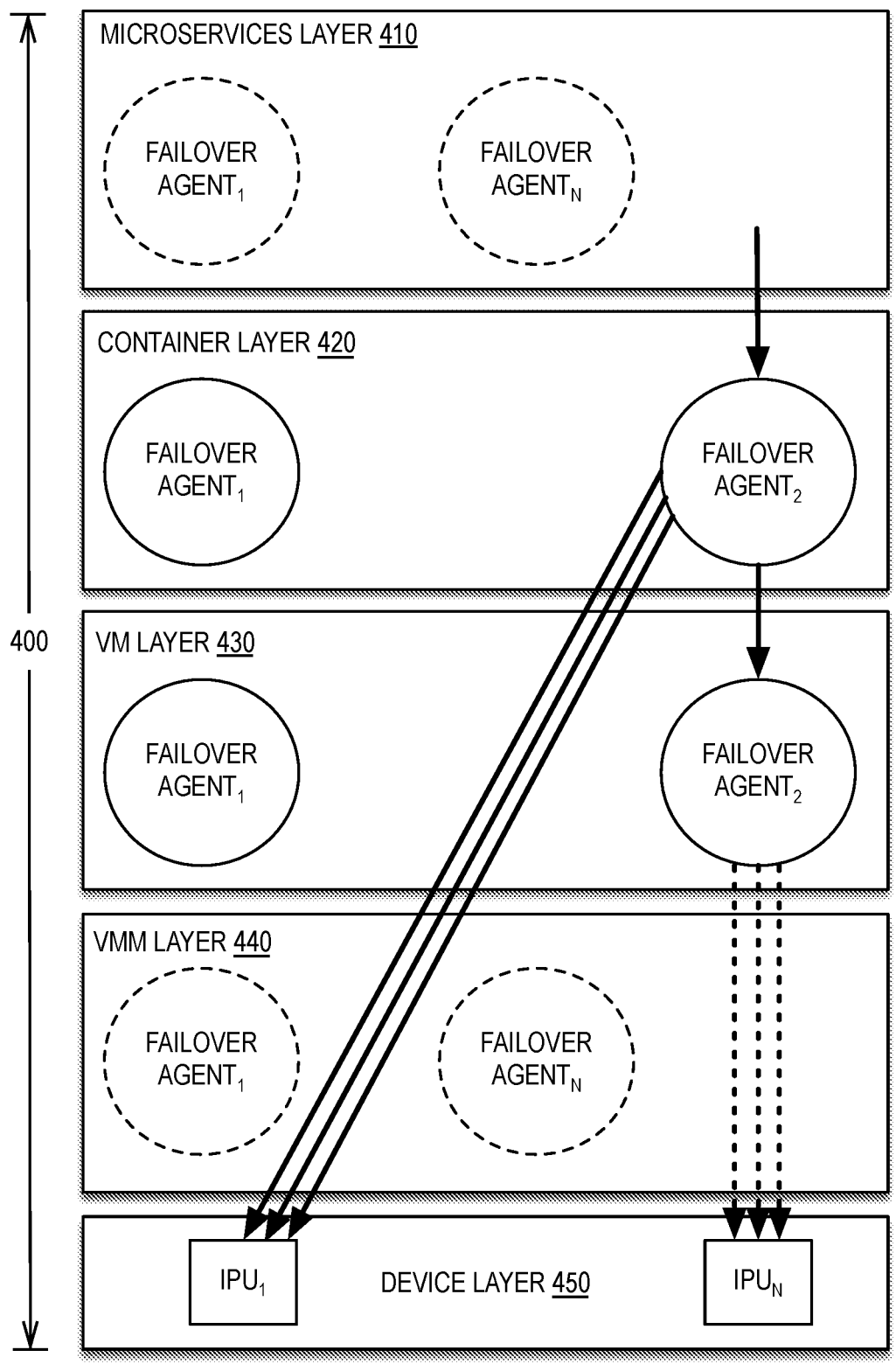
FIG. 4 is a block diagram illustrating dependency graphs within a microservices service stack for alternative hardware/software service instances of a service offered by a service provider according to some embodiments.

FIG. 4 is a block diagram illustrating dependency graphs within a microservices service stack 400 for alternative hardware/software service instances of a service offered by a service provider according to some embodiments. In the context of the present example, microservices service stack 400 is shown including a device layer 450 (e.g., connecting to the heterogeneous hardware devices (e.g., XPUs, SSDs, etc. shown in FIG. 1), a microservices layer 410, a container layer 420, a VM layer 430, and a VMM layer 440 (which may be referred to herein collectively as microservices service stack layers). Each of the layers of the microservices service stack layers may implement one or more redundancy features, for example, a given layer may include zero or failover agents. In order to take advantage of the finer granularity of both hardware and software components in a disaggregated computing environment in which a microservices-based services is implemented, it is desirable to address errors (e.g., take corrective action and/or implement failover/takeover operations) at the lowest possible layer of microservices service stack 400. As such, in embodiments described herein, each of the layers implementing a redundancy feature may take policy-based actions as information regarding the occurrence of an error is propagated through the layers.

In some examples, backup or secondary failover agents within a particular layer may monitor the health and/or operational status of the primary failover agent and may take policy-based actions. For example, the sidecar (not shown) of a secondary microservice (e.g., failover agent$_N$) within the microservices layer may perform a health check in accordance with a configured monitoring interval and may take policy-based actions responsive thereto (e.g., event/error logging, notification/alert, takeover responsibilities for the primary). In the VMM layer 430, a failover agent may represent a peer agent available as a backup to the primary that is running in System Management Mode (SMM) and monitoring the primary.

In the context of the present example, the solid lines may identify a failover scenario for a first dependency graph for a first potential hardware/software configuration of a service instance and the dashed lines may be part of a failover scenario for a second dependency graph for a second potential hardware/software configuration of the service instance. For example, as noted above, a streaming service provider may have multiple sets of competing ingredients (e.g., one for an all CPU environment and one that makes use of GPUs).

While in the present example, certain enumerated layers are depicted, it is to be appreciated more or fewer layers may be included in microservices service stack 400. For example, microservices service stack 400 may also include host OS, guest OS, and middleware layers.

Figure 5:
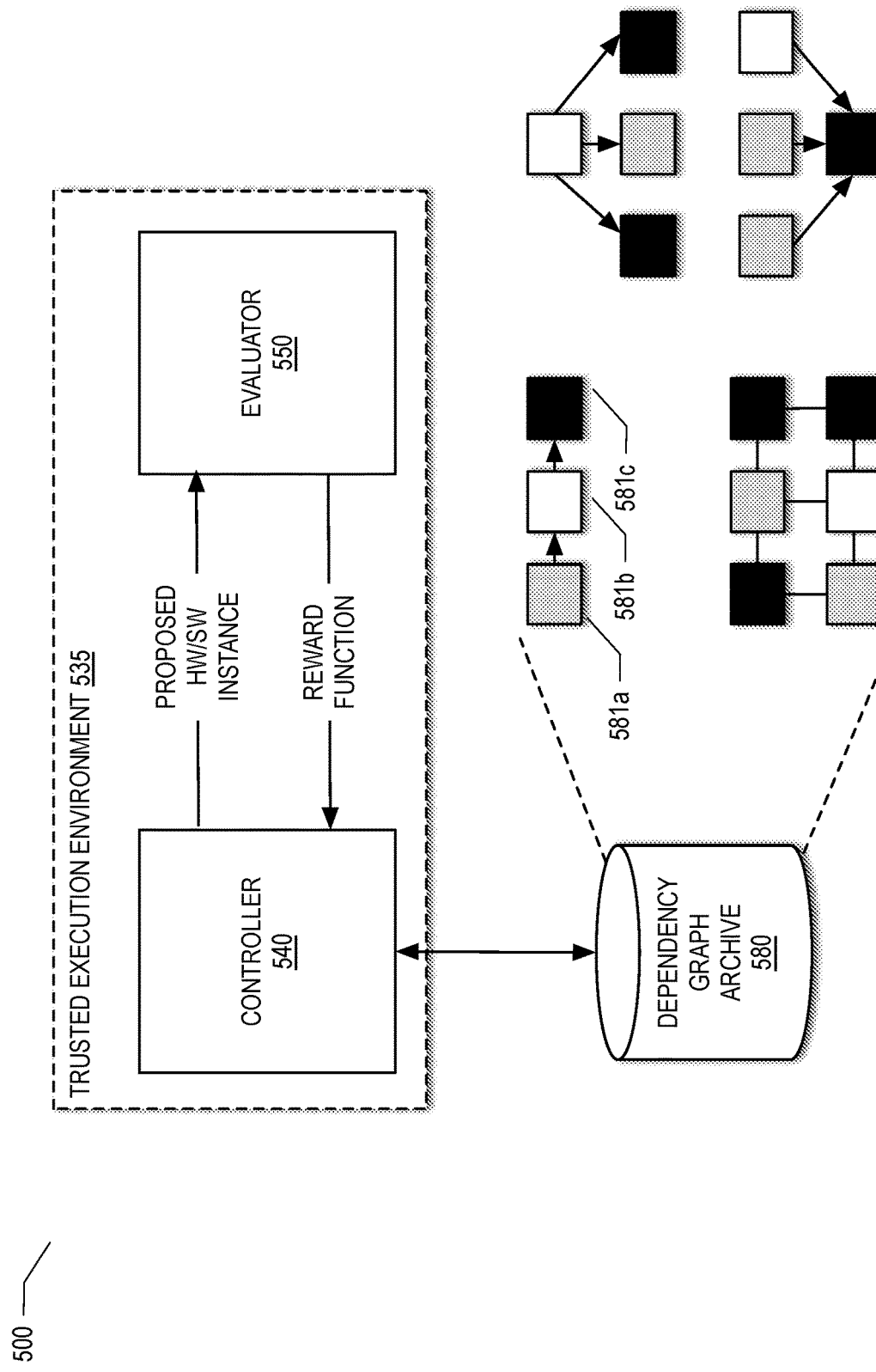
FIG. 5 is a diagram illustrating an operational schematic for managing failover agents according to some embodiments.

FIG. 5 is a diagram illustrating an operational schematic 500 for managing failover agents according to some embodiments. In some embodiment, service management component 340 described with respect to FIG. 3 may implements operational schematic 500. In the context of the present example, operational schematic 500 includes a TEE 535 hosting controller 540 and evaluator 550. In one implementation, controller 540 may be the same as controller 350 described with respect to FIG. 3 and evaluator 550 may be the same as evaluator 360 described with respect to FIG. 3.

As described above, based on, among other things, the SLA model architecture, information gathered during the discovery phase by a discovery service (e.g., discovery service 356), including candidate XPU dependency graphs stored in dependency graph archive 580, controller 540 may generate a proposed hardware/software instance to implement a particular service.

Evaluator 550 may perform checks on controller 540 using a machine-learning based reward function, for example, by implementing reinforcement learning. The reward function may provide an incentive mechanism that encourages correct behavior and that discourages incorrect behavior on behalf of controller 540. For example, evaluator 550 may monitor whether various metrics of an SLA are being met by a hardware/software instance proposed by controller 540 to implement a particular service. Depending upon the particular implementation, the reward function may provide feedback at one or more levels of granularity. For example, the reward function may be communicated for one or more microservices service stack layers, on a failover-by-failover basis, or at a service instance level.

In implementations herein, dependency graph archive 580 may include an SLA model architecture and various XPU interdependent flow graphs, for example, representing how interchangeable compute kernels 581a-c (e.g., microservices 320) may be placed on different compute platforms (e.g., represented by different shading).

The various services, modules, engines, managers, and the like of service platform 300 and the processing described below with reference to the flow diagrams of FIGS. 6-7 may be implemented in the form of executable instructions stored on a machine readable medium and executed by a processing resource (e.g., a microcontroller, a microprocessor, a CPU core, an ASIC, an FPGA, or the like) and/or in the form of other types of electronic circuitry. For example, the processing may be performed by one or more virtual or physical computer systems of various forms, such as the computer system described below with reference to FIG. 8.

Figure 6:
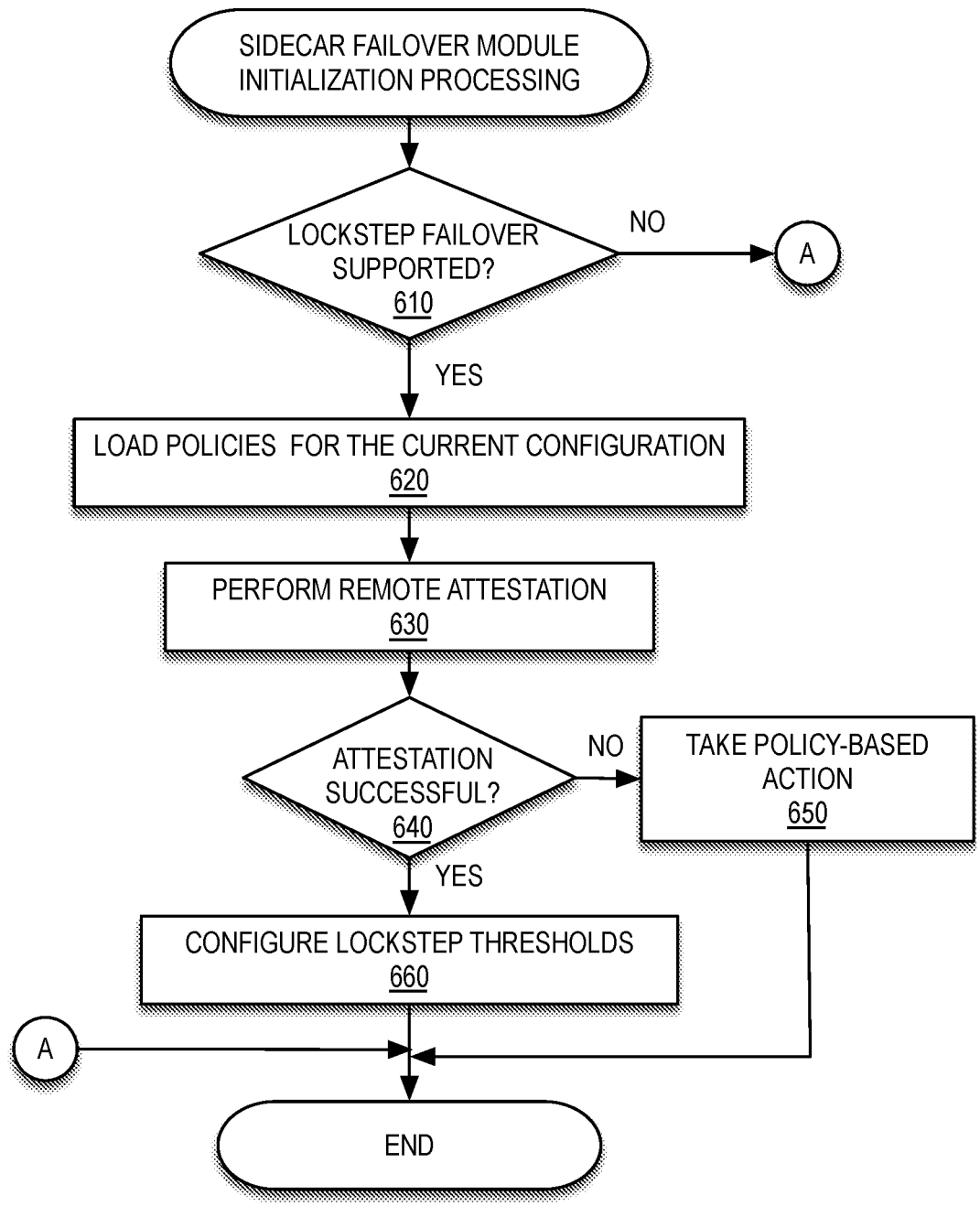
FIG. 6 is a flow diagram illustrating operations for performing sidecar failover module initialization processing according to some embodiments.

FIG. 6 is a flow diagram illustrating operations for performing sidecar failover module initialization processing according to some embodiments. The processing described with reference to FIG. 6 may be performed by a sidecar failover module (e.g., failover module 335 of FIG. 3) to perform various initialization tasks.

At decision block 610, it is determined whether lockstep failover is supported and enabled by the microservices-based service at issue. If so, processing continues with block 620; otherwise, processing is complete and the service will operate in legacy mode.

At block 620, policies may be loaded for the service instance. For example, the sidecar failover module may load appropriate policies from secure storage for the current configuration (e.g., as recommended by recommendation service 352) of the service instance. Non-limiting examples of the policies include the granularity of the reward function emitted by an evaluator (e.g., evaluator 550), management policies, and thresholds (e.g., lockstep telemetry thresholds).

At block 630, remote attestation may be performed. For example, the sidecar failover module may perform an attestation protocol with a Trusted Platform Module (TPM) of the platform on which the sidecar is running, a BMC (e.g., BMC 215) of the platform, and a service management controller (e.g., SMC 170, 350, or 540).

At decision block 640, it is determined whether the remote attestation performed at block 630 was successful. If so, processing continues with block 660; otherwise, processing branches to block 650.

At block 650, a policy-based action may be taken. For example, the service may be configured to operate in legacy mode.

At block 660, lockstep thresholds may be configured. The lockstep thresholds may be defined with reference to various types of telemetry data and may specify the conditions in which lockstep operation of failover microservices agents should break lockstep operation, for example, and allow a secondary microservice takeover for a primary microservice.

Lockstep thresholds may be configured within the sidecar failover module to allow the sidecar failover module to enforce lockstep thresholds for telemetry data visible to the sidecar. The BMC may also be configured (e.g., via the Redfish protocol) with lockstep thresholds to allow the BMC to enforce lockstep thresholds for telemetry data visible to the BMC. Depending upon the particular implementation telemetry data that may be the subject of various lockstep thresholds may include telemetry metadata associated with transactions of the microservices, telemetry metadata collected from processing resources (e.g., processing resources 212), software telemetry, and the like. The telemetry metadata associated with the transactions of the microservices may include metadata regarding data at rest, in motion and in compute across heterogenous XPU blocks (including the software stack). Such telemetry metadata may include identification of the microservice processing the transaction, the communication from the sidecar, XPU compute utilization data, and/or XPU compute characteristics data.

Figure 7:
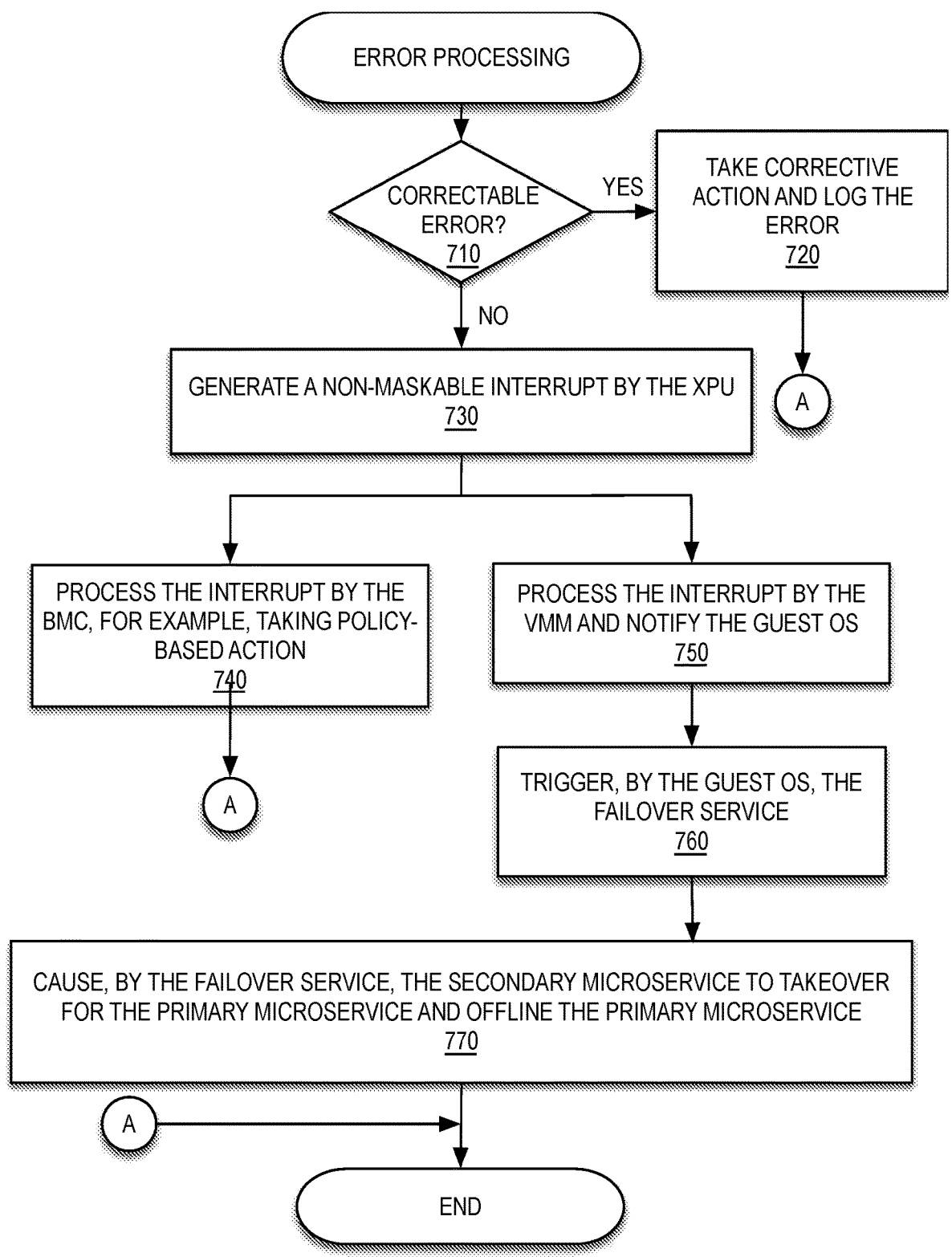
FIG. 7 is a flow diagram illustrating operations for performing error processing according to some embodiments.

FIG. 7 is a flow diagram illustrating operations for performing error processing according to some embodiments. In the context of the present example, it is assumed a hardware error has occurred on a processing resource (e.g., one of processing resources 212) of a platform (e.g., platform 202) on which a primary microservice (e.g., microservice 325a) for a particular task or function of a service is running. It is also assumed the service instance of which the primary microservice is a part supports failover agents. As such, a secondary microservice (e.g., microservice 325b) is assumed to be operating in lockstep with the primary microservice and is available to take over responsibility for the task being performed by the primary microservice. Depending upon the placement, the secondary microservice may be running on a different processing resource on the same platform as the primary microservice or may be running on a different platform.

At decision block 710, it is determined whether the error represents a correctable error. If so, processing branches to block 720; otherwise, processing continues with block 730.

At block 720, corrective action is taken by the processing resource to resolve the error. Additionally, the processing resource may log the error, for example, by creating an entry in a system event log. At this point, as error recovery has been successfully completed, error processing is complete and the primary microservice may continue its operations.

At block 730, a non-maskable interrupt (NMI) is generated by the processing resource. In this manner, higher-level hardware and/or software may make appropriate decisions on how to handle the error, for example, including whether to break lockstep operations of the primary and secondary microservices and perform a failover from the primary microservice to the secondary microservice. In one embodiment, the NMI is a machine check exception. The machine check exception may include information regarding the error source and the error reason. The machine check exception may be propagated to both a BMC (e.g., BMC 215) of the platform and a VMM (e.g., hypervisor 213) running on the platform.

At block 740, the interrupt is processed by the BMC. In one embodiment, the BMC may log the error and take a policy-based action. For example, the BMC may alert a fleet management module. According to one embodiment, the BMC-based notification to the fleet management module helps to provide alerts to other cooperating microservices residing in different platforms (e.g., nodes B, C, and/or D) regarding the failure and regarding the recovery process happening on the first platform (e.g., node A), for example, so they don't get stuck or hang waiting for node A to respond.

At block 750, the interrupt is processed by the VMM and the VMM notifies the guest OS (e.g., guest system 222) of the error. At this point, the VMM may clear the interrupt, for example, by signaling an end of interrupt (EOI).

At block 760, the guest OS may acknowledge the notification from the VMM and trigger a failover service (e.g., failover service 354 of FIG. 3). The guest OS may also generate an alert or notification to an administrative user to take corrective action and may also record the error.

At block 770, the failover service causes the secondary microservice to takeover for the primary microservice and offlines the primary microservice. The communication from the failover service to the primary and secondary microservices may be via their respective sidecar failover modules (e.g., failover module 335a, 335b). Depending upon the particular implementation, the failover service may restart or reset the primary microservice, for example, to allow it to now operate as a new failover microservice. Alternatively, the secondary service may continue execution of the task or operation that was being performed by the primary service in non-lockstep mode until the task or operation is complete or until it has been migrated to a new lockset microservice pair. According to one embodiment, the secondary service may resume at a last known good checkpoint associated with the primary service. For example, the secondary microservice may retrieve failover metadata persisted (e.g., to microservice state 326a) by the primary microservice. In some examples, the failover service may additionally inform an evaluator (e.g., evaluator 360) of the failover, for example, to allow a mirroring service (e.g., mirroring service 362) to begin making preparations for appropriate container and sidecar mirroring.

While in the context of the present example, the failover microservice agents (e.g., the primary microservice and the secondary microservice) are assumed to be communicating via the same sidecar communication channel, in other embodiments the failover microservice agents can use different sidecar communication channels to extend the approach to communication failover service.

While in the context of the flow diagrams presented herein, a number of enumerated blocks are included, it is to be understood that the examples may include additional blocks before, after, and/or in between the enumerated blocks. Similarly, in some examples, one or more of the enumerated blocks may be omitted or performed in a different order.

Figure 8:
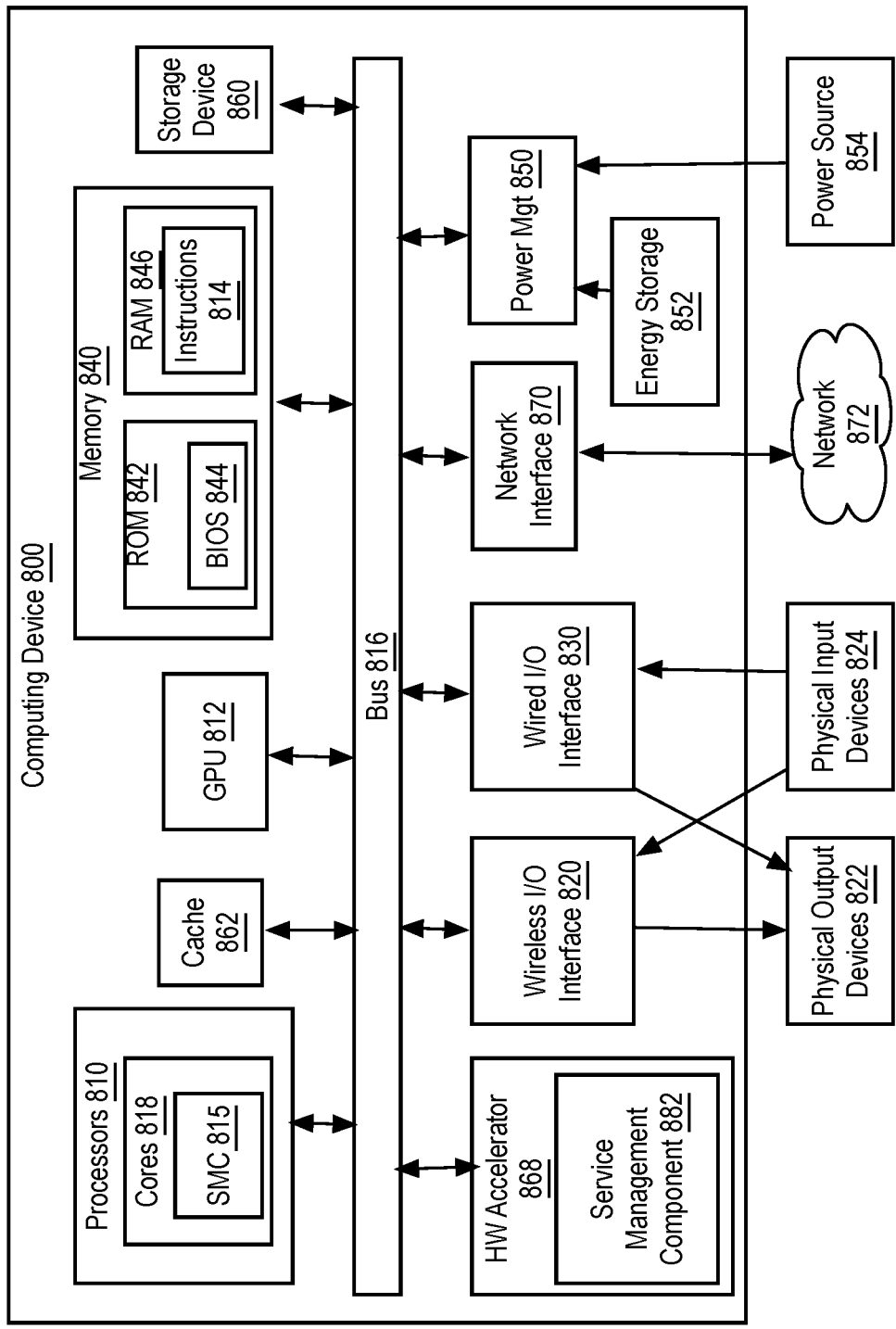
FIG. 8 is a schematic diagram of an illustrative electronic computing device according to some embodiments.

FIG. 8 is a schematic diagram of an illustrative electronic computing device 800 according to some embodiments. In some embodiments, the computing device 800 includes one or more processors 810 including one or more processors cores 818 including a service management component (SMC) 815, such as service management component 170, 340 described with respect to FIGS. 1 and 3A. In some embodiments, the one or more processor cores 818 establish a TEE to host the SMC 815. In some embodiments, the computing device 800 includes a hardware accelerator 868, the hardware accelerator including a service management component 882, such as service management component 170, 340 described with respect to FIGS. 1 and 3A. In some embodiments, the hardware accelerator 868 establishes a TEE to host the service management component 882. In some embodiments, the computing device is to provide provenance audit trails for microservices architectures, as provided in FIGS. 1-5B.

The computing device 800 may additionally include one or more of the following: cache 862, a graphical processing unit (GPU) 812 (which may be the hardware accelerator in some implementations), a wireless input/output (I/O) interface 820, a wired I/O interface 830, system memory 840 (e.g., memory circuitry), power management circuitry 850, non-transitory storage device 860, and a network interface 870 for connection to a network 872. The following discussion provides a brief, general description of the components forming the illustrative computing device 800. Example, non-limiting computing devices 800 may include a desktop computing device, blade server device, workstation, or similar device or system.

In embodiments, the processor cores 818 are capable of executing machine-readable instruction sets 814, reading data and/or instruction sets 814 from one or more storage devices 860 and writing data to the one or more storage devices 860. Those skilled in the relevant art can appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 818 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 800 includes a bus or similar communications link 816 that communicably couples and facilitates the exchange of information and/or data between various system components including the processor cores 818, the cache 862, the graphics processor circuitry 812, one or more wireless I/O interfaces 820, one or more wired I/O interfaces 830, one or more storage devices 860, and/or one or more network interfaces 870. The computing device 800 may be referred to in the singular herein, but this is not intended to limit the embodiments to a single computing device 800, since in certain embodiments, there may be more than one computing device 800 that incorporates, includes, or contains any number of communicably coupled, collocated, or remote networked circuits or devices.

The processor cores 818 may include any number, type, or combination of currently available or future developed devices capable of executing machine-readable instruction sets.

The processor cores 818 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 8 are of conventional design. Consequently, such blocks are not described in further detail herein, as they can be understood by those skilled in the relevant art. The bus 816 that interconnects at least some of the components of the computing device 800 may employ any currently available or future developed serial or parallel bus structures or architectures.

The system memory 840 may include read-only memory ("ROM") 842 and random access memory ("RAM") 846. A portion of the ROM 842 may be used to store or otherwise retain a basic input/output system ("BIOS") 844. The BIOS 844 provides basic functionality to the computing device 800, for example by causing the processor cores 818 to load and/or execute one or more machine-readable instruction sets 814. In embodiments, at least some of the one or more machine-readable instruction sets 814 cause at least a portion of the processor cores 818 to provide, create, produce, transition, and/or function as a dedicated, specific, and particular machine, for example a word processing machine, a digital image acquisition machine, a media playing machine, a gaming system, a communications device, a smartphone, or similar.

The computing device 800 may include at least one wireless input/output (I/O) interface 820. The at least one wireless I/O interface 820 may be communicably coupled to one or more physical output devices 822 (tactile devices, video displays, audio output devices, hardcopy output devices, etc.). The at least one wireless I/O interface 820 may communicably couple to one or more physical input devices 824 (pointing devices, touchscreens, keyboards, tactile devices, etc.). The at least one wireless I/O interface 820 may include any currently available or future developed wireless I/O interface. Example wireless I/O interfaces include, but are not limited to: BLUETOOTH®, near field communication (NFC), and similar.

The computing device 800 may include one or more wired input/output (I/O) interfaces 830. The at least one wired I/O interface 830 may be communicably coupled to one or more physical output devices 822 (tactile devices, video displays, audio output devices, hardcopy output devices, etc.). The at least one wired I/O interface 830 may be communicably coupled to one or more physical input devices 824 (pointing devices, touchscreens, keyboards, tactile devices, etc.). The wired I/O interface 830 may include any currently available or future developed I/O interface. Example wired I/O interfaces include but are not limited to universal serial bus (USB), IEEE 1394 ("FireWire"), and similar.

The computing device 800 may include one or more communicably coupled, non-transitory, data storage devices 860. The data storage devices 860 may include one or more hard disk drives (HDDs) and/or one or more solid-state storage devices (SSDs). The one or more data storage devices 860 may include any current or future developed storage appliances, network storage devices, and/or systems. Non-limiting examples of such data storage devices 860 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 860 may include one or more removable storage devices, such as one or more flash drives, flash memories, flash storage units, or similar appliances or devices capable of communicable coupling to and decoupling from the computing device 800.

The one or more data storage devices 860 may include interfaces or controllers (not shown) communicatively coupling the respective storage device or system to the bus 816. The one or more data storage devices 860 may store, retain, or otherwise contain machine-readable instruction sets, data structures, program modules, data stores, databases, logical structures, and/or other data useful to the processor cores 818 and/or graphics processor circuitry 812 and/or one or more applications executed on or by the processor cores 818 and/or graphics processor circuitry 812. In some instances, one or more data storage devices 860 may be communicably coupled to the processor cores 818, for example via the bus 816 or via one or more wired communications interfaces 830 (e.g., Universal Serial Bus or USB); one or more wireless communications interfaces 820 (e.g., Bluetooth®, Near Field Communication or NFC); and/or one or more network interfaces 870 (IEEE 802.3 or Ethernet, IEEE 802.11, or Wi-Fi®, etc.).

Processor-readable instruction sets 814 and other programs, applications, logic sets, and/or modules may be stored in whole or in part in the system memory 840. Such instruction sets 814 may be transferred, in whole or in part, from the one or more data storage devices 860. The instruction sets 814 may be loaded, stored, or otherwise retained in system memory 840, in whole or in part, during execution by the processor cores 818 and/or graphics processor circuitry 812.

The computing device 800 may include power management circuitry 850 that controls one or more operational aspects of the energy storage device 852. In embodiments, the energy storage device 852 may include one or more primary (i.e., non-rechargeable) or secondary (i.e., rechargeable) batteries or similar energy storage devices. In embodiments, the energy storage device 852 may include one or more supercapacitors or ultracapacitors. In embodiments, the power management circuitry 850 may alter, adjust, or control the flow of energy from an external power source 854 to the energy storage device 852 and/or to the computing device 800. The power source 854 may include, but is not limited to, a solar power system, a commercial electric grid, a portable generator, an external energy storage device, or any combination thereof.

For convenience, the processor cores 818, the graphics processor circuitry 812, the wireless I/O interface 820, the wired I/O interface 830, the storage device 860, and the network interface 870 are illustrated as communicatively coupled to each other via the bus 816, thereby providing connectivity between the above-described components. In alternative embodiments, the above-described components may be communicatively coupled in a different manner than illustrated in FIG. 8. For example, one or more of the above-described components may be directly coupled to other components, or may be coupled to each other, via one or more intermediary components (not shown). In another example, one or more of the above-described components may be integrated into the processor cores 818 and/or the graphics processor circuitry 812. In some embodiments, all or a portion of the bus 816 may be omitted and the components are coupled directly to each other using suitable wired or wireless connections.

Many of the methods may be described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes a system comprising: one or more processing resources; and a machine-readable medium, coupled to the processing resource, having stored therein instructions, which when executed by the processing resource cause the processing resource to: responsive to an uncorrectable hardware error associated with a processing resource of a platform on which a task of a service is being performed by a primary microservice, receive a failover trigger; identify a secondary microservice that is operating in lockstep mode with the primary microservice; direct the secondary microservice to takeover performance of the task in non-lockstep mode based on failover metadata persisted by the primary microservice; and offline the primary microservice.

Example 2 includes the subject matter of Example 1, further comprising a controller for the service and an evaluator, wherein the controller is operable to perform discovery regarding availability of XPUs coupled to the system for use by an instance of the service, and wherein the evaluator is operable to provide feedback to the controller based on telemetry data collected by the evaluator regarding performance of the service.

Example 3 includes the subject matter of Examples 1-2, wherein a processing resource of the one or more processing resources provides a trusted execution environment (TEE) for the controller and the evaluator.

Example 4 includes the subject matter of Examples 1-3, wherein the feedback comprises a machine-learning based reward function.

Some embodiments pertain to Example 5 that includes a method comprising: responsive to an uncorrectable hardware error associated with a processing resource of a platform on which a task of a service is being performed by a primary microservice, receiving, by a failover service, a failover trigger; identifying, by the failover service, a secondary microservice that is operating in lockstep mode with the primary microservice; causing, by the failover service, the secondary microservice to takeover performance of the task in non-lockstep mode based on failover metadata persisted by the primary microservice; and causing, by the failover service, the primary microservice to be taken offline.

Example 6 includes the subject matter of Example 5, wherein the secondary microservice is running on a second processing resource of a different platform than the primary microservice, and wherein said causing, by the failover service, the secondary service to takeover performance of the task includes indirectly directing the secondary microservice via a baseboard management controller (B MC) of the platform.

Example 7 includes the subject matter of Examples 5-6, wherein the secondary microservice is running on a second processing resource of the platform, and wherein said causing, by the failover service, the secondary service to takeover performance of the task includes communicating with a sidecar of the secondary microservice.

Example 8 includes the subject matter of Examples 5-7, wherein the failover trigger is received from a guest OS on which the failover service is running responsive to the guest OS being notified of an interrupt received by a virtual machine manager (VMM).

Example 9 includes the subject matter of Examples 5-8, wherein the interrupt comprises a non-maskable interrupt (NMI) generated by the processing resource responsive to the uncorrectable hardware error.

Example 10 includes the subject matter of Examples 5-9, wherein the NMI comprises a machine check exception.

Example 11 includes the subject matter of Examples 5-10, further comprising responsive to receipt of the NMI by a BMC of the platform, taking a policy-based action by the BMC.

Example 12 includes the subject matter of Examples 5-11, wherein the policy-based action comprises alerting a fleet management module of a datacenter providing the service.

Some embodiments pertain to Example 13 that includes a non-transitory computer-readable storage medium having stored thereon executable computer program instructions that, when executed by one or more processors, cause the one or more processors to perform operations comprising:

responsive to an uncorrectable hardware error associated with a processing resource of a platform on which a task of a service is being performed by a primary microservice; receiving, by a failover service, a failover trigger; identifying, by the failover service, a secondary microservice that is operating in lockstep mode with the primary microservice; causing, by the failover service, the secondary microservice to takeover performance of the task in non-lockstep mode based on failover metadata persisted by the primary microservice; and causing, by the failover service, the primary microservice to be taken offline.

Example 14 includes the subject matter of Example 13, wherein the secondary microservice is running on a second processing resource of a different platform than the primary microservice, and wherein said causing, by the failover service, the secondary service to takeover performance of the task includes indirectly directing the secondary microservice via a baseboard management controller (BMC) of the platform.

Example 15 includes the subject matter of Examples 13-14, wherein the secondary microservice is running on a second processing resource of the platform, and wherein said causing, by the failover service, the secondary service to takeover performance of the task includes communicating with a sidecar of the secondary micro service.

Example 16 includes the subject matter of Examples 13-15, wherein the failover trigger is received from a guest OS on which the failover service is running responsive to the guest OS being notified of an interrupt received by a virtual machine manager (VMM).

Example 17 includes the subject matter of Examples 13-16, wherein the interrupt comprises a non-maskable interrupt (NMI) generated by the processing resource responsive to the uncorrectable hardware error.

Example 18 includes the subject matter of Examples 13-17, wherein the NMI comprises a machine check exception.

Example 19 includes the subject matter of Examples 13-18, wherein the operations further comprise responsive to receipt of the NMI by a BMC of the platform, taking a policy-based action by the BMC.

Example 20 includes the subject matter of Examples 13-19, wherein the policy-based action comprises alerting a fleet management module of a datacenter providing the service.

Some embodiments pertain to Example 21 that includes an apparatus that implements or performs a method of any of Examples 5-12.

Example 22 includes at least one machine-readable medium comprising a plurality of instructions, when executed on a computing device, implement or perform a method or realize an apparatus as described in any preceding Example.

Example 23 includes an apparatus comprising means for performing a method as claimed in any of Examples 5-12.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system comprising:
a processing resource; and
a machine-readable medium, coupled to the processing resource, having stored therein instructions, which when executed by the processing resource cause the processing resource to:
receive a failover trigger indicative of an uncorrectable error associated with an XPU on which a task of a service is being performed by a primary microservice;
after receipt of the failover trigger, identify a secondary microservice operating in lockstep with the primary microservice; and
direct the secondary microservice to takeover performance of the task based on failover metadata persisted by or on behalf of the primary microservice.

2. The system of claim 1, wherein the instructions further cause the processing resource to restart or reset the primary microservice to operate as a new failover microservice operating in lockstep with the secondary microservice.

3. The system of claim 1, wherein direction to the secondary microservice to take over performance of the task is performed via a sidecar of the secondary microservice.

4. The system of claim 1, wherein the system is operable within a disaggregated computing datacenter.

5. The system of claim 1, wherein the XPU is associated with a first computing platform and wherein the secondary microservice is running on a second XPU associated with a different computing platform than the first computing platform.

6. A method comprising:
receiving a failover trigger indicative of an uncorrectable error associated with an XPU on which a task of a service is being performed by a primary microservice;
after receipt of the failover trigger, identifying a secondary microservice operating in lockstep mode with the primary microservice; and
causing the secondary microservice to takeover performance of the task based on failover metadata persisted by or on behalf of the primary microservice.

7. The method of claim 6, wherein the XPU is associated with a first computing platform, wherein the secondary microservice is running on a second XPU associated with a different computing platform than the first computing platform, and wherein said causing the secondary microservice to takeover performance of the task includes indirectly directing the secondary microservice via a baseboard management controller (BMC) of the different computing platform.

8. The method of claim 6, wherein the secondary microservice is running on a second XPU of a computing platform with which the XPU is associated, and wherein said causing the secondary service to takeover performance of the task includes communicating with a sidecar of the secondary microservice.

9. The method of claim 6, wherein the service is orchestrated and managed by a service management component and wherein the method further comprises:
performing, by a controller of the service management component, discovery regarding availability of XPUs within a disaggregated computing datacenter that are available for use by the service;

collecting, by an evaluator of the service management component, telemetry data indicative of performance of the service; and providing, by the evaluator, feedback to the controller based on the performance.

10. The method of 9, wherein the controller and the evaluator are operable within a trusted execution environment (TEE).

11. The method of claim 6, wherein the failover trigger is received from a guest operating system (OS) on which a failover service is running after the guest OS is notified of an interrupt received by a virtual machine manager (VMM).

12. The method of claim 11, wherein the interrupt comprises a non-maskable interrupt (NMI) generated by the XPU responsive to the uncorrectable error.

13. The method of claim 12, wherein the NMI comprises a machine check exception.

14. The method of claim 13, further comprising after receipt of the NMI by a BMC of a computing platform with which the XPU is associated, taking a policy-based action by the BMC.

15. The method of claim 14, wherein the policy-based action comprises alerting a fleet management module of a datacenter providing the service.

16. A non-transitory computer-readable storage medium having stored thereon instructions that, when executed by one or more processors, cause the one or more processors to:
receive a failover trigger indicative of an uncorrectable error associated with an XPU on which a task of a service is being performed by a primary microservice;
after receipt of the failover trigger, identify a secondary microservice operating in lockstep mode with the primary microservice; and
cause the secondary microservice to takeover performance of the task based on failover metadata persisted by or on behalf of the primary microservice.

17. The non-transitory computer-readable storage medium of claim 16, wherein the XPU is associated with a first computing platform, wherein the secondary microservice is running on a second XPU associated with a different computing platform than the first computing platform, and wherein the secondary service is caused to takeover performance of the task by indirectly directing the secondary microservice via a baseboard management controller (BMC) of the different computing platform.

18. The non-transitory computer-readable storage medium of claim 16, wherein the secondary microservice is running on a second XPU of a computing platform with which the XPU is associated, and wherein the secondary microservice is caused to takeover performance of the task by communicating with a sidecar of the secondary microservice.

19. The non-transitory computer-readable storage medium of claim 16, wherein the service is orchestrated and managed by a service management component and wherein the instructions further cause the one or more processors to:
perform, by a controller of the service management component, discovery regarding availability of XPUs within a disaggregated computing datacenter that are available for use by the service;
collect, by an evaluator of the service management component, telemetry data indicative of performance of the service; and
provide, by the evaluator, feedback to the controller based on the performance.

20. The non-transitory computer-readable storage medium of 19, wherein the controller and the evaluator are operable within a trusted execution environment (TEE) provided by a processor of the one or more processors.

21. The non-transitory computer-readable storage medium of claim 16, wherein the failover trigger is received from a guest operating system (OS) on which a failover service is running after the guest OS is notified of an interrupt received by a virtual machine manager (VMM).

* * * * *